Patented Feb. 11, 1930

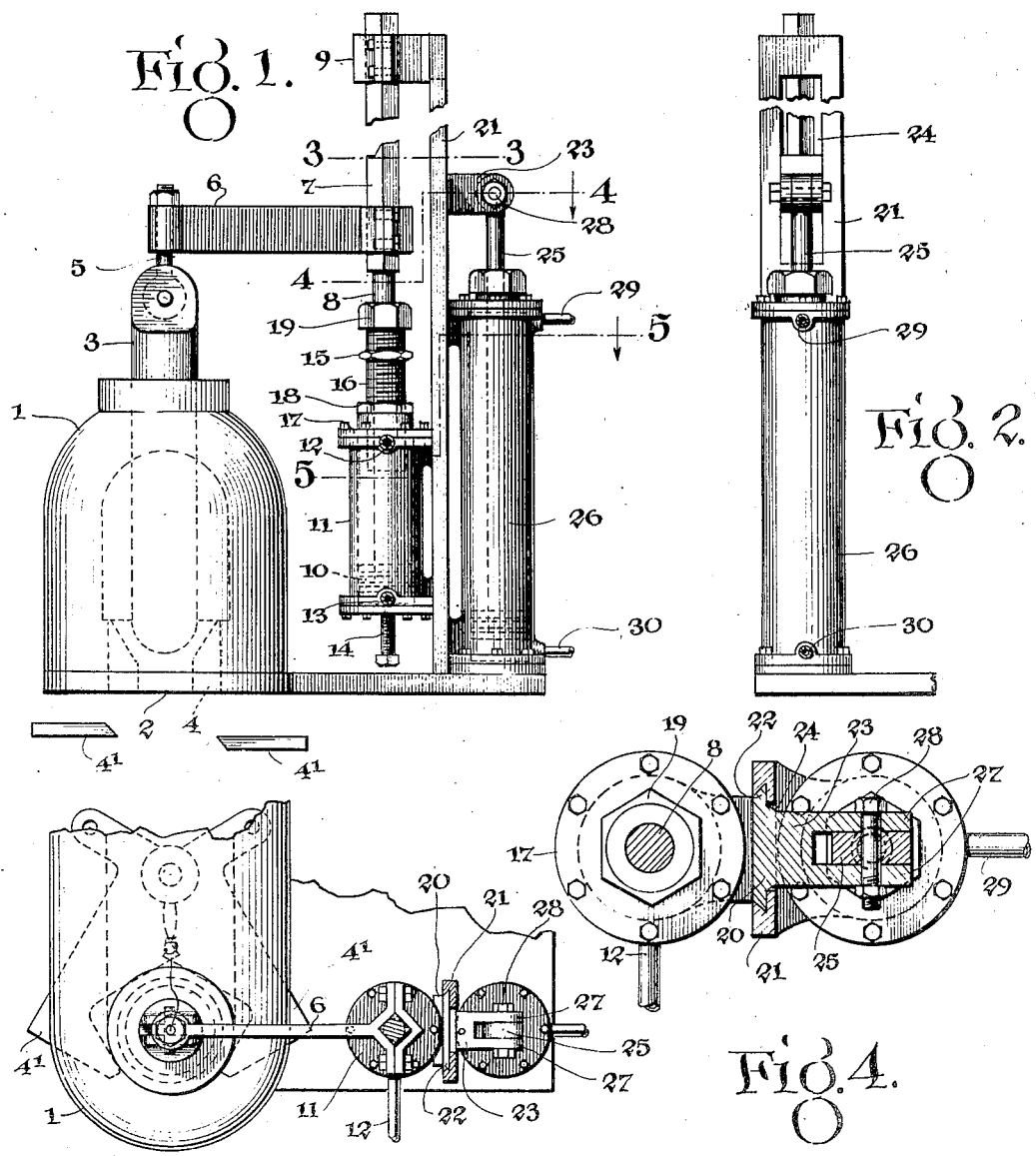

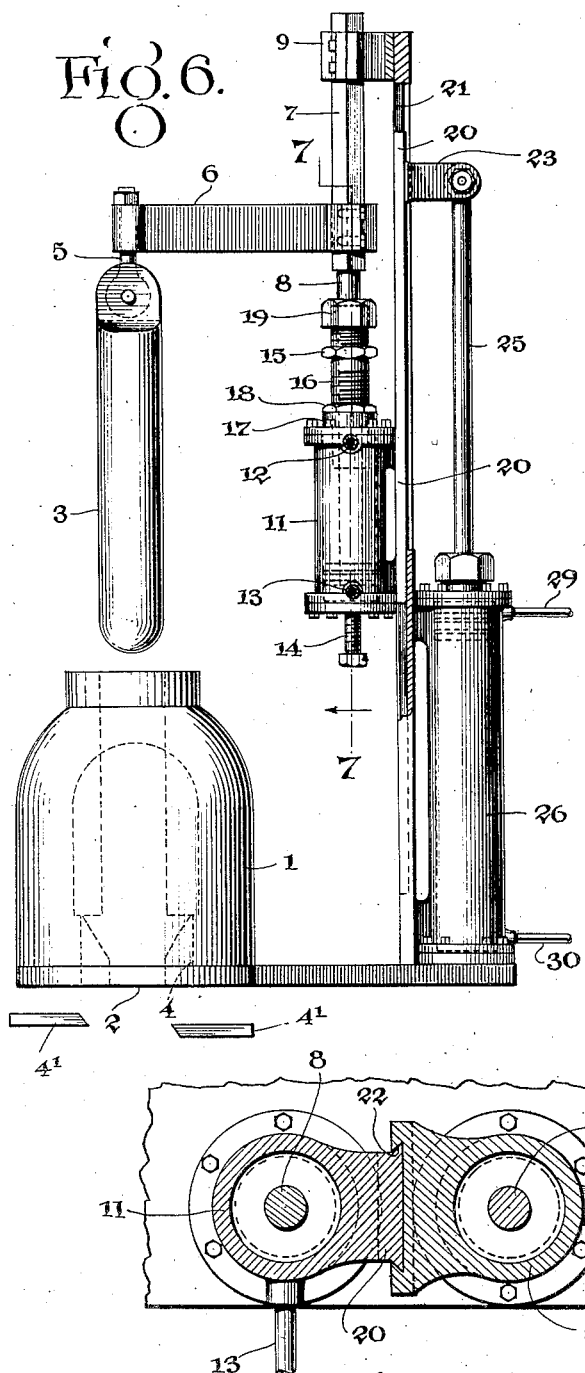
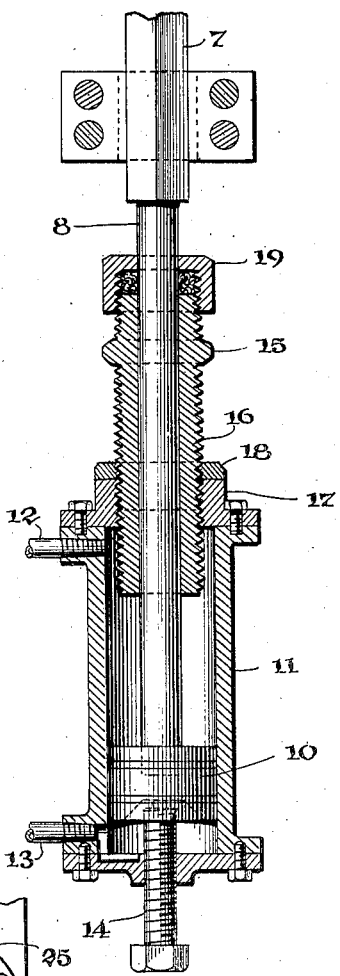
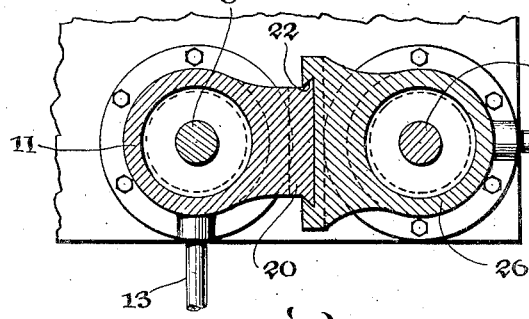

1,746,913

UNITED STATES PATENT OFFICE

THOMAS STENHOUSE, OF WASHINGTON, PENNSYLVANIA, ASSIGNOR TO HAZEL-ATLAS GLASS CO., OF WHEELING, WEST VIRGINIA, A CORPORATION OF WEST VIRGINIA

PLUNGER-OPERATING MECHANISM FOR GLASS FURNACES

Application filed March 22, 1922. Serial No. 545,763.

My invention relates to plunger operating mechanisms for glass furnaces, and one of the objects thereof is to provide suitable means for operating the plunger by air or other fluid pressure.

Another object of my invention is to provide a mechanism of this character by which the length of stroke of the plunger may be quickly and easily varied, to suit varying conditions.

A further object of my invention is to provide suitable means by which the plunger may be entirely withdrawn from the flow spout whenever it is necessary to install another plunger.

Still another object of my invention is to provide a plunger operating mechanism of such a character that the operator will have perfect control thereof, and will be able not only to accurately regulate the quantity of glass in the glass drops, but also will be able by simple adjustments to vary the shape of the glass drops as they are delivered from the flow spout to be sheared and dropped into the molds.

Other and further objects and advantages of my invention will be obvious to those skilled in the art, from the following description, when taken in connection with the accompanying drawings; in which, Figure 1 is an end elevation of the entire mechanism, the plunger being in its lowered position.

Figure 2 is a side elevation of the apparatus, the flow spout being omitted.

Figure 3 is a horizontal sectional view taken on line 3—3 of Figure 1.

Figure 4 is an enlarged sectional view taken on line 4—4 of Figure 1.

Figure 5 is an enlarged sectional view taken on line 5—5 of Figure 1.

Figure 6 is an end elevation of the entire mechanism, showing the plunger entirely withdrawn from the flow spout; and, Figure 7 is a vertical sectional view taken on line 7—7 of Figure 6.

Referring to the drawings more in detail, numeral 1 indicates an ordinary type of flow spout or tank associated with a glass furnace, and having a flow hole or orifice 2 at the bottom thereof, and a plunger 3 of high heat resistance material, adapted to reciprocate vertically in the spout or tank over the flow hole. A bushing 4 is located in the flow hole of the spout, and it is the common practice to use bushings of various sizes in accordance with the capacity desired. The shears for shearing the glass drops are indicated by numeral 4'. All of such structure is old and well known in the art, and a detailed description thereof is unnecessary. As the plunger is reciprocated a portion of molten glass of predetermined quantity is delivered through the flow hole; and my invention relates to the means for operating this plunger.

Prior to my invention the practice has been to operate the plunger by means of a very expensive and complex system of gears, cams, etc. By employing a cylinder for operating the plunger the operating mechanism is reduced to the utmost simplicity; but there is a further advantage of even greater importance, which advantage results from the fact that the operator has perfect control of the plunger, and by simple manipulations he is able to supply the molds with glass drops of the desired shape and size.

In the particular construction shown, the plunger is pivotally mounted on a hook 5 bolted to a cross-arm 6, which cross-arm is clamped to the squared portion 7 of a piston rod 8. It will be understood, of course, that I am not limited to this specific structure. The plunger may be mounted in any manner desired, and I may substitute any other desirable construction for operatively connecting the plunger to the piston rod.

The upper end of the piston rod is guided in the bearing 9, and at its lower end carries a piston 10 mounted in the cylinder 11.

The piston is operated by compressed air or other fluid pressure supplied alternately above and below the piston; the inlet and outlet ports in the upper and lower portions of the cylinder being indicated by numerals 12 and 13 respectively. The pressure may be supplied to the cylinder in timed relation by any desired means, and as the manner of supplying the pressure constitutes no part of the present invention, it is not deemed necessary to illustrate such a mechanism.

As the piston and piston rod are reciprocated the plunger will also be reciprocated in the flow spout, and portions of molten glass of predetermined quantity will be delivered through the flow hole, in the well known manner. When the plunger is forced upward it retracts the severed portion of glass adhering thereto into the body of glass in the flow spout, where it is reheated. The employment of air or other fluid pressure as a means of effecting the operation of the plunger is very simple and effective, and in actual practice gives much better results than the complex system of gears, cams, etc., heretofore employed.

In the operation of the plunger it is highly desirable to regulate the length of stroke thereof, and I will now describe the means by which this is accomplished.

The extent of the downward stroke of the piston, and hence of the plunger, is regulated by the screw 14 mounted in the lower cylinder head of cylinder 11. A nut 15, having a screw-threaded sleeve 16, is screw-threadedly mounted in the upper cylinder head 17, and this sleeve has a passage therethrough to receive the piston rod and to permit it to reciprocate therein. Numeral 18 refers to a lock nut for locking the adjustable sleeve in adjusted position. A packing gland 19 of conventional type is mounted at the top of the adjustable sleeve, thereby rendering an airtight connection between the sleeve and piston rod. The extent of the upward stroke of the piston rod and plunger is regulated by merely adjusting the sleeve 16.

It will be apparent from the foregoing description that I have devised not only an extremely simple and effective means for controlling and regulating the length of stroke of the plunger, but also for adjusting the stopping point of the plunger in both its upward and downward strokes. That is, by the use of my mechanism the length of stroke may be varied by varying the adjusting means at either the top or the bottom of the cylinder; or if it should be desired to maintain the same length of stroke and yet vary the position of the plunger when at the limits of its stroke, then it is only necessary to move both adjustments the same distance in the same direction. It will be understood, of course, that the frequency of the stroke of the piston and plunger may be varied by the adjustment of the timing mechanism in any well known manner.

In the manufacture of glass articles the particular shape of the glass portion, or glass drop, delivered to the mold, is an important factor. Of course the shape of the drop depends partly on the consistency of the glass, but it will be obvious that the shape of the glass drop can be largely controlled by the operation of the plunger; for the length of the stroke, the frequency of the stroke, and the distance between the plunger and the outlet when the former is at the end of its downward stroke, are all important factors in determining the shape of the glass drop, and from the foregoing description it is apparent that all of the adjustments necessary to produce the desired shape of the glass drop, may be made with the greatest ease.

Whenever it becomes necessary to substitute a new plunger, either because of breakage or because a plunger of different capacity is required, it is very desirable that the substitution be made quickly, and with as little inconvenience as possible to the operators. As the operation of substituting another plunger must be made in the presence of excessive heat, it will be obvious that the operation may be performed in much less time, and under much more favorable working conditions, if the plunger can be withdrawn entirely from the flow spout and the glass therein.

I will now describe the mechanism by which the plunger may be instantly withdrawn from the flow spout, whereby the operation of substituting another plunger is greatly facilitated.

The cylinder 11 is attached to a plate 20 which is slidably mounted in a standard 21 in any suitable manner, such as the dovetail construction indicated by numeral 22. Attached to or integral with the plate 20, is an arm 23 which projects through a slot 24 provided in the upper portion of the standard 21. This arm is attached to the piston rod 25 of the cylinder 26 in any desired manner. In the specific structure illustrated herein the arm is bifurcated as indicated by numeral 27, and the upper end of the piston rod is positioned in the slot thus formed, and attached to the arm by the bolt 28.

The cylinder 26 is an ordinary fluid pressure cylinder adapted to the use of compressed air or other fluid, and having fluid outlet and inlet ports adjacent the top and bottom thereof, indicated by numerals 29 and 30 respectively. It is merely a conventional cylinder and no further description thereof is necessary.

The operation of withdrawing the plunger from the flow spout will be clearly understood. It is only necessary to admit pressure to the bottom of the cylinder 26, thereby lifting the rod 25 which is connected to the arm 23 carried by the plate 20. As the plate 20 carries the cylinder 11, it is apparent that the cylinder 11, its piston rod 8, cross-arm 6 and plunger 3, will be elevated to the position shown in Figure 6, whereby the plunger is entirely withdrawn from the flow spout, and another plunger may be quickly and easily substituted. If a cap is employed over the flow spout and around the plunger, it will not even be necessary to remove the cap, as is necessary in the prior practice, for the plunger will be lifted entirely clear of such cap.

When the operation of substituting another plunger is completed, pressure may be admitted to the upper portion of the cylinder, 26, thereby lowering the various parts and returning the plunger to its operative position in the flow spout.

From the foregoing description it will be apparent that many highly desirable results are accomplished by the simple mechanism which I have devised. Among the many advantages of my mechanism over plunger operating mechanisms previously known, the following may be mentioned.

The use of compressed air, or other fluid pressure, for effecting the operation of the plunger is very simple and effective, and in actual practice gives much better results than the complex systems of gears, cams, etc., heretofore employed.

The length of the stroke may be quickly varied by the adjustments provided; and in addition to varying the length of stroke the adjustments also present means whereby the movement of the plunger may be arrested at exactly the desired point, in both its upward and downward stroke. And by the simple adjustments provided the operator is enabled to make the glass drops of the exact size desired, and also to make the glass drops conform to the shape which is most desirable.

When it is necessary for the purpose of repairs or otherwise, to withdraw the plunger entirely from the flow spout, this may be accomplished instantly by admitting pressure to the bottom of the cylinder 26. And, of course, by being able to entirely withdraw the plunger, the operation of substituting another plunger may be performed more quickly and under more favorable working conditions.

In accordance with the patent statutes I have described the particular embodiment of the invention shown herein, but I do not wish to be understood thereby as limiting myself or the scope of my invention, as many changes and modifications may be made without departing from the spirit of the invention, and all such I aim to include in the scope of the appended claims.

What I claim as new and desire to secure by Letters Patent is:

1. In a glass furnace, a reciprocable plunger, means for operating the plunger, said means including a fluid pressure cylinder, a sleeve adjustably mounted in one end of the cylinder and a rod adjustably mounted in the other end of the cylinder, to vary the limits of stroke of the piston and plunger.

2. In a glass furnace, a reciprocable plunger, means for operating the plunger, said means including a fluid pressure cylinder, an adjustable sleeve mounted in the upper end of the cylinder, a piston rod mounted in the sleeve and projecting upwardly above the sleeve, a cross-arm rigidly secured to the upwardly extending piston rod, said reciprocable plunger being attached to the opposite end of the cross arm.

3. In a glass furnace, a reciprocable plunger, means for operating the plunger, said means including a fluid pressure cylinder, an adjustable sleeve screw-threadedly engaged in the upper portion of the cylinder, said sleeve provided with a passage therethrough, a piston rod reciprocally mounted in said passage and projecting upwardly beyond the sleeve, said piston rod being operatively connected with the plunger.

4. In a glass furnace, a reciprocable plunger, means for operating the plunger, said means including a fluid pressure cylinder, an adjustable sleeve screw-threadedly engaging the upper portion of the cylinder for varying the upper limit of the piston and plunger, and adjustable means provided in the lower portion of the cylinder for varying the lower limit of the piston and plunger.

5. In a glass furnace, a reciprocable plunger, a fluid pressure cylinder operatively connected with the plunger, means arranged in the lower portion of the cylinder for adjusting the length of the plunger stroke, and means for raising said cylinder and plunger bodily, whereby the plunger is withdrawn from the flow spout of the furnace.

6. In a glass furnace, a flow spout, a reciprocable plunger mounted therein, a fluid pressure cylinder operatively connected with said plunger, means arranged in the lower portion of the cylinder for adjusting the length of the plunger stroke, and a second fluid pressure cylinder adapted to raise the plunger and first mentioned cylinder bodily, whereby the plunger is entirely withdrawn from the flow spout.

7. A glass furnace including a flow spout, a plunger adapted to reciprocate in the flow spout, a cross-arm carrying said plunger, a piston rod carrying said cross-arm, a fluid pressure cylinder for operating said piston rod, and a second fluid pressure cylinder adapted to lift the first mentioned cylinder.

8. In a glass furnace, a reciprocable plunger, a fluid pressure cylinder operatively connected with said plunger, a standard, a plate slidably mounted on said standard, said plate carrying said cylinder, said standard provided with a slot, an arm carried by the plate and projecting through the slot, and means for moving said arm vertically.

9. In a glass furnace, a reciprocable plunger, a fluid pressure cylinder operatively connected with said plunger, a standard, a plate slidably mounted on said standard, said plate carrying said cylinder, said standard provided with a slot, an arm carried by the plate and projecting through the slot, and fluid pressure operated means for moving said arm vertically.

10. In a glass furnace, a flow spout, a reciprocable plunger mounted therein, a laterally extending arm carrying said plunger, a cylinder for reciprocating said arm, and a second cylinder for lifting the plunger clear of the flow spout.

11. In a glass furnace, a flow spout, a reciprocable plunger mounted therein, a laterally extending arm carrying said plunger, means for reciprocating said arm, and a normally inoperative cylinder for lifting the plunger clear of the flow spout.

THOMAS STENHOUSE.